Feb. 19, 1952     G. MATTERSDORF     2,585,953
FLUID PRESSURE PRODUCING DEVICE

Filed Aug. 9, 1946     3 Sheets—Sheet 1

INVENTOR
Gustav Mattersdorf
BY
ATTORNEY

Feb. 19, 1952 — G. MATTERSDORF — 2,585,953
FLUID PRESSURE PRODUCING DEVICE
Filed Aug. 9, 1946 — 3 Sheets-Sheet 2
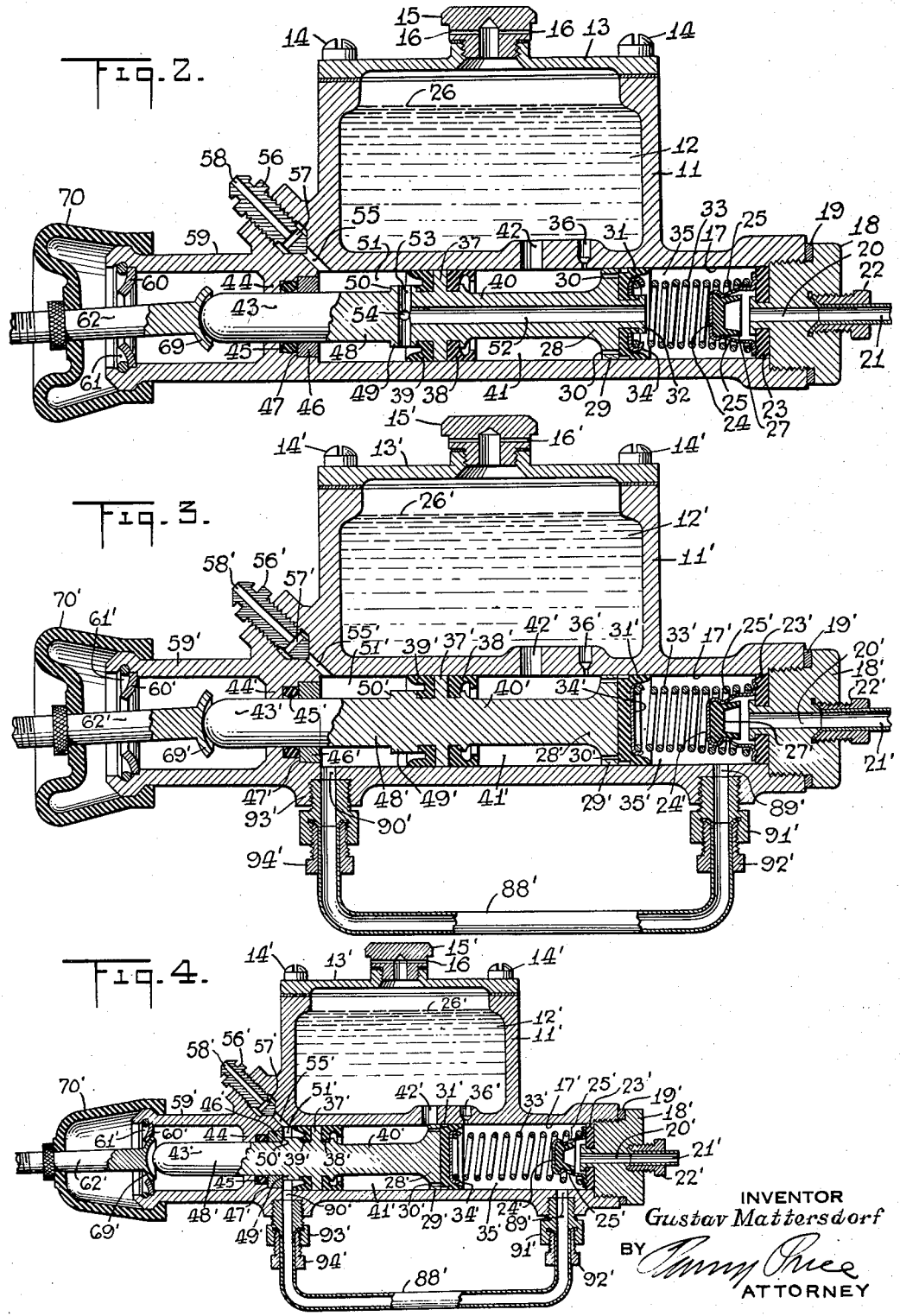
INVENTOR
Gustav Mattersdorf
BY
ATTORNEY Feb. 19, 1952 G. MATTERSDORF 2,585,953
FLUID PRESSURE PRODUCING DEVICE
Filed Aug. 9, 1946 3 Sheets-Sheet 3
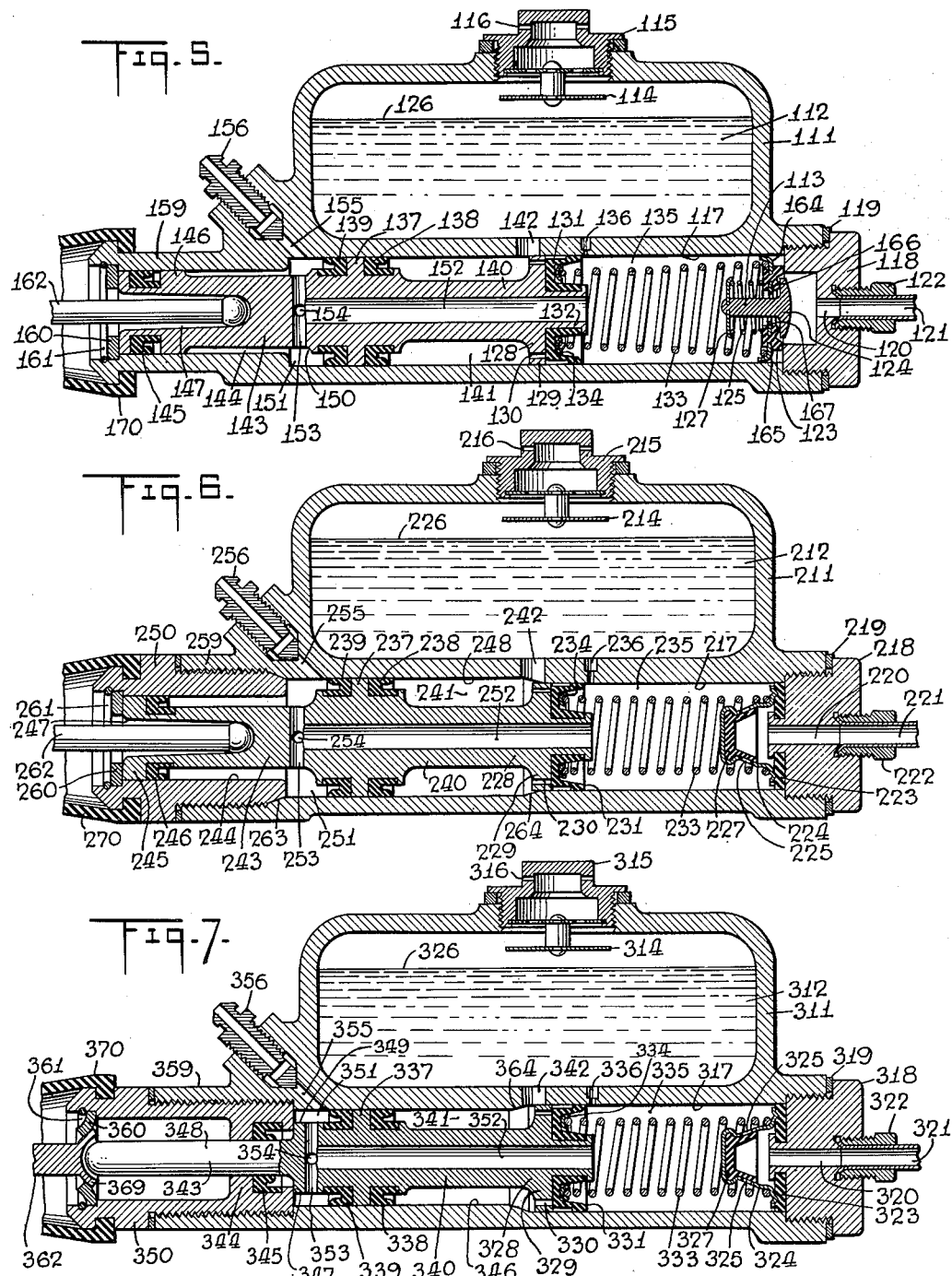
INVENTOR
Gustav Mattersdorf
BY
ATTORNEY Patented Feb. 19, 1952

2,585,953

UNITED STATES PATENT OFFICE 2,585,953

FLUID PRESSURE PRODUCING DEVICE

Gustav Mattersdorf, New York, N. Y.

Application August 9, 1946, Serial No. 689,606

15 Claims. (Cl. 60—54.6)

This invention relates to fluid pressure systems and to fluid pressure producing devices for such systems and it will be more particularly described in its application to hydraulic braking systems.

Although the present invention is particularly applicable to hydraulic braking systems and to master cylinders therefor, it should be understood that it may also advantageously be applied to other types of fluid pressure systems and fluid pressure producing mechanisms in connection with automotive equipment, aircraft, and stationary devices.

In hydraulic braking systems, the amount of fluid pressure obtainable is limited by the extent to which the diameter of the master cylinder can be reduced, since with equal pedal application the pressure increases as the cylinder diameter is decreased.

Various types of fluid pressure producing mechanisms have been devised to provide higher produced pressure to applied force ratios, but these are of complicated design and construction, requiring numerous and often critically adjusted moving parts and auxiliary valves and generally have the added disadvantage of requiring two operative stages, a low pressure and a high pressure stage, with a more or less sudden or abrupt transition from one stage to the other, which impairs the smoothness of operation as well as the adequacy of operative "feel" in the case of manual or pedal operation. Because of their complicated construction, the number of moving parts and the generally close tolerances required, such mechanisms are relatively difficult and costly to manufacture and service and, in addition, are more subject to malfunctioning and failure than conventional types.

The prime object of this invention, therefore, is to provide a fluid pressure producing device or mechanism which, with any given piston diameter, will produce a higher pressure with the same actuating or applied force or which will produce an equal pressure with less actuating force.

A further important object is to provide a master cylinder for a hydraulic brake mechanism where the pressure increase is relatively gradual and in which there are no distinct low pressure and high pressure operative stages and, therefore, no sudden or abrupt transitions from low to high pressure and requiring no staging valves or auxiliary valve mechanisms.

An additional object of this invention is to provide a fluid pressure producing mechanism simple in design and construction, easy and inexpensive to manufacture and requiring a minimum of servicing and repair.

The above objects are accomplished by providing a fluid pressure producing device or master cylinder having cylinder means and piston means received in said cylinder means, said piston means being actuated by an external force such as through a foot pedal. The cylinder and piston means include:

(1) A primary cylinder;

(2) A primary piston or piston head therein defining a primary fluid pressure chamber in said cylinder;

(3) A secondary cylinder;

(4) A secondary piston or piston head in said secondary cylinder, said piston being the same as or separate from said primary piston and moving with said primary piston and defining a secondary fluid pressure chamber in said secondary cylinder and having a smaller effective pressure application area than said primary piston; and (5) Fluid passage means connecting said pressure chambers and providing continuous fluid communication between them.

In addition to supplying pressure to the external pressure system, the fluid pressure induced in the primary pressure chamber by the application of the external force to the piston is also communicated to the secondary pressure chamber and applied to the smaller effective cross-sectional or pressure application area of the secondary piston, thereby assisting the externally applied actuating force and supplying part of the operative effort.

Since the oppositely faced primary and secondary pistons or piston heads are connected to move together and since due to the difference in their effective pressure application areas, the secondary pressure chamber is expanded upon advance of the piston to a lesser extent than the primary pressure chamber is compressed, the two pressure chambers, in view of their fluid intercommunication, in effect form one compressible pressure chamber in which the net effective work or pressure producing area is equivalent to the difference between the effective pressure application areas of the primary and secondary pistons.

Still further objects will appear from the more detailed description set forth below, it being understood, however, that this more detailed description is given by way of illustration since various changes therein may be made by those skilled in the art and since the invention may be applied to pressure producing mechanisms other than those specifically described, all without departing from the scope and spirit of the invention.

Referring to the drawings which illustrate several of the various possible embodiments of the present invention, but to which the present invention is by no means restricted, since the drawings are merely by way of illustration and not by way of limitation:

Fig. 2 is a similar section of the master cylinder depicted in Fig. 1 but in an operative position;

Fig. 3 is a vertical, longitudinal section in an operative position of a modification of the master cylinder embodiment depicted in Figs. 1 and 2;

Fig. 4 is a similar section, in inoperative position, of the modified embodiment depicted in Fig. 3;

Fig. 5 is a vertical, longitudinal section, in inoperative position, of a master cylinder of somewhat different construction embodying my invention;

Fig. 6 is a vertical, longitudinal section, in inoperative position, of a further embodiment of my invention as applied to a master cylinder; and Fig. 7 is a vertical, longitudinal section, in inoperative position, of still another embodiment of my invention as applied to a master cylinder.

Figure 1:
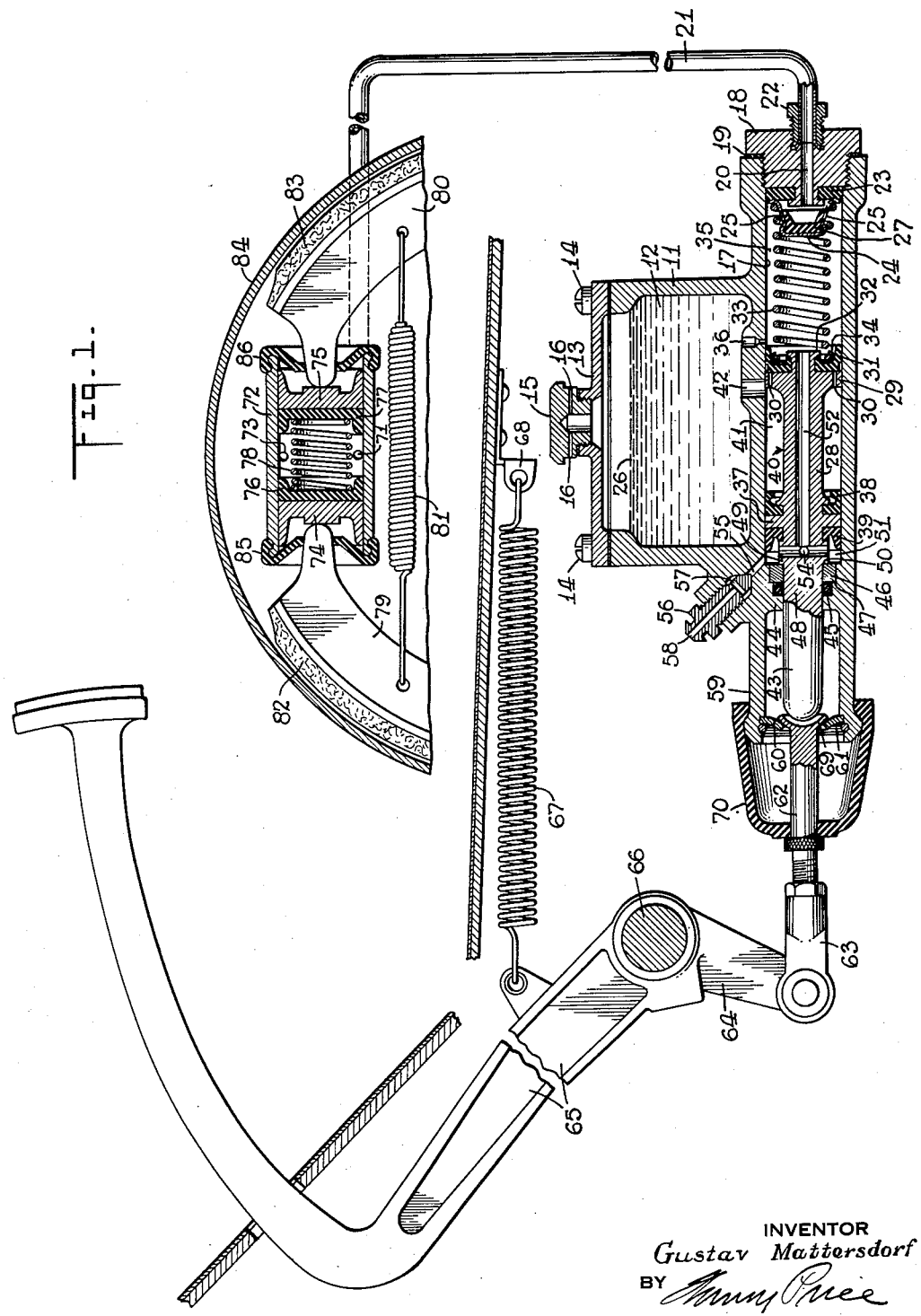
Fig. 1 is a diagrammatic showing of a hydraulic brake system, including a vertical, longitudinal sectional view of a liquid pressure producing device or a master cylinder, together with a pedal for actuating the same, and also a fragmentary sectional showing of one of the brakes operated by the device, all in normal, inoperative position.

In Figs. 1 and 2, a housing 11 is attached to a frame member of the vehicle or other fixed support (not shown). The upper portion of the housing forms a reservoir 12 closed at the top by cover plate 13 which is held in place by screws 14 and provided with filler plug 15 vented as at 16.

The lower portion of the housing 11 forms a cylinder 17 plugged at the forward end by a threaded plug 18 provided with a gasket 19 and with fluid port 20 connecting the cylinder 17 to the hydraulic tubing or brake line 21 through fitting 22.

Positioned against the rear face of plug 18 is the rubber valve seat 23. Against the rear surface of the valve seat 23 normally rests the metal valve cage 24 containing annularly disposed holes 25 normally closed by the projecting lips of the rubber valve cup 27.

Within the cylinder bore 17 is a substantially spool shaped piston 28 having a forward piston head 29 provided with annularly disposed liquid ports 30 normally closed by the rubber sealing and valve cup 31 which surrounds the piston projection 32 and rests against the forward face of piston head 29, being retained thereagainst by the return spring 33 disposed between sealing cup and the valve cage 24, the piston end of the spring resting in metal cup 34.

The spring 33 also serves as a loading spring for the valve assembly comprising the cage 24, the cup 27 and the seat 23.

The portion of the cylinder 17 in front of the sealing cup 31 and piston head 29 constitutes the primary fluid pressure chamber 35 which, in the inoperative position of the piston 28 as shown in Fig. 1, is in fluid communication with the reservoir 12 through the small compensating or by-pass port 36.

Rearwardly the piston 28 is provided with a second piston head 37 which, in turn, is provided with forward sealing cup 38 and rear sealing cup 39 positioned respectively against its front and rear faces.

The piston 28 has a central portion 40 of smaller outside diameter connecting the piston heads 29 and 37, thereby providing an annular fluid chamber 41 communicating with the reservoir 12 through the fluid port 42. Since the fluid in the reservoir is always in communication with the atmosphere through vents 16 in filler plug 15, the liquid in the annular fluid chamber 41 is always at substantially atmospheric pressure.

The piston 28 also is provided with a piston rod 43 extending rearwardly from the second piston head 37, the rearward portion of the rod, designated as 48, being of reduced diameter and projecting through a corresponding opening in end wall 44 which encloses the rear end of the cylinder 17. The sealing ring 45 surrounding the piston rod 43 and positioned in a recess in the cylinder end wall 44 is provided to prevent leakage and is held in place by collar 46 inserted as by a press fit in another recess of somewhat larger diameter in the cylinder end wall, thereby providing a shoulder 47 to limit and fix the position of the collar 46. In effect, therefore, the collar 46 may be considered part of the rear end wall 44.

The piston rod 43, in addition to the protruding portion 48, has a more forward portion 49 of somewhat larger diameter thereby forming a shoulder 50 which in inoperative position of the piston 28 abuts the retaining collar 46 and accordingly limits the rearward motion of the piston.

The portion of the cylinder 17 between the rear sealing cup 39 for the piston head 37 and the cylinder end wall 44 forms a secondary fluid pressure chamber 51 surrounding the piston rod 43.

The piston 28 and piston rod 43 are also provided with longitudinal fluid port 52 and transverse fluid ports 53 and 54 which are all interconnected. Since the port 52 opens into the primary pressure chamber 35 and the connected ports 53 and 54 open into the secondary pressure chamber 51, the two pressure chambers are at all times and in all phases of operation in unrestricted fluid communication. For this reason, the fluid pressures within the two chambers are equal.

Connected to the upper portion of secondary fluid chamber 51 is the bleeder port 55 which is normally plugged by the threaded bleeder plug 56 having fluid passages 57 and 58. The purpose of this arrangement is to provide means for bleeding any air which may be trapped in the secondary fluid chamber. This is necessary because this chamber is not provided with any other fluid port connecting with the vented fluid reservoir 12 as is the case with primary pressure chamber 35 and annular chamber 41.

Rearward of the cylinder end wall 44, the housing 11 forms a substantially cylindrical extension 59 surrounding the piston rod 43. Mounted in a suitable recess at the rear end of extension 59 is the washer 60 held in place by snap ring 61.

Passing through the central hole of the washer 60 is the link 62 connected with the clevis 63 which, in turn, is connected to the arm 64 of the brake pedal lever 65. The latter is pivotally connected to a stationary or frame member at 66 and is provided with return spring 67 the opposite end of which is attached as at 68 to a frame or other stationary member.

In normal, inoperative position the head 69 of the connecting link 62 rests against the inner face of the washer 60, which, by limiting the outward motion of the link and, consequently, the upward motion of the pedal, serves as a pedal stop. The purpose of the connecting link 62 is to transmit motion from the pedal 65 to the piston 28 through piston rod 48. The piston stop provided by the shoulder 50 and the link or pedal stop provided by the washer 60 are so spaced that in the inoperative position as shown in Fig. 1 there is a slight clearance between the link 62 and the piston rod 48.

The rubber boot 70 connecting the extension 59 and the link 62 is provided to exclude dirt and foreign matter.

The tubing 21 serves as a brake or supply line connecting the cylinder 17 through the valve assembly 23, 24 and 27 to the lower port 71 of wheel cylinder 72, the upper port 73 serving as a bleeder port and being normally plugged. The wheel cylinder 72 is provided with a pair of spaced pistons, 74 and 75, provided respectively with sealing cups 76 and 77 having an interposed spring 78. Abutting the pistons 74 and 75 are the respective toe ends of the brake shoes 79 and 80 constrained toward a released position by the connecting spring 81 and having lining members 82 and 83 adapted for frictional contact with the brake drum 84. The boots 85 and 86 are provided to exclude dirt and foreign matter.

The system, including the cylinder, brake lines, etc., is filled with suitable hydraulic fluid, the trapped air being removed by pumping the piston back and forth and by bleeding at various points such as at bleeder port 73 in wheel cylinder 72 and at bleeder port 55 connected to the secondary chamber 51 of the master cylinder. The reservoir 12 is left filled approximately to the level 26.

To apply the brakes, pedal 65 is depressed causing arm 64, clevis 63 and link 62 to move to the right (see Fig. 1). The first portion of the pedal stroke serves to close the gap between the link 62 and the piston rod 43. Thereafter, the motion of the link 62 is imparted to the piston rod 43, and consequently to the piston 28 and cup 31, thereby reducing the size of the primary chamber 35 while simultaneously increasing the size of the secondary chamber 51. Although the extreme diameters of both the primary and secondary chambers are the same, the space occupied by the piston rod 43, determined by the diameter of the rear portion 48, renders the effective cross-sectional area of piston head 37 less than that of piston head 28. Because of this and also because the piston heads are connected and accordingly constrained to move simultaneously, the volumetric increase of the secondary chamber 51 is less for any given piston motion than the volumetric decrease of the primary chamber 35.

It should be noted that the reduction in the effective cross-sectional area of the piston head 37 is dependent on the diameter of the rear portion 48, and not on the diameter of the forward portion 49, of the piston rod 43. This is so since, as will be apparent from Fig. 2, the shoulder 50 augments the effective cross-sectional area of the piston head 37 and must accordingly be considered as part thereof.

It should also be noted that the opening in the primary piston 29 due to the longitudinal piston port 52 does not in effect reduce the cross-sectional area of the said primary piston since the reduction in area is precisely offset by a similar vertical area at the juncture of ports 52, 53 and 54, this area being a projection of the port 52 on the rear walls of the ports 53 and 54.

During the initial portion of the piston stroke, the by-pass port 36 is closed by the projecting lip of the sealing cup 31. Until this is done, a portion of the fluid displaced from primary chamber 35 is transferred through piston ports 52, 53 and 54 to secondary chamber 51, and the balance of the fluid is expelled through port 36 into the reservoir 12. The proportion of the displaced fluid transferred from the primary to the secondary chambers is governed by the ratio between their respective displacements. Thus, if the displacement of the secondary chamber is, for example, two-thirds the displacement of the primary chamber for any given piston stroke, two-thirds of the displaced fluid is transferred to the secondary chamber and one-third is expelled into the reservoir.

Continued motion of the piston 28 after closing of the by-pass port 36 results in a continued transfer of the same proportion of the displaced fluid from the primary to the secondary chamber. The remainder of the displaced fluid is forced out of the primary chamber, through the holes 25 of the valve cage 24 by forcibly deflecting the lips of the rubber valve cup 27 (see Fig. 2) and out through the port 20. The fluid thus expelled moves the whole liquid column in the supply line 21 thereby forcing additional fluid into the wheel cylinder 72 which, in turn, forces the pistons 74 and 75 further apart thereby actuating the lining members 82 and 83 attached to the shoes 79 and 80 respectively into frictional contact with the drum 84.

It will be seen that not only is the fluid in the primary chamber 35 under pressure but, due to the intercommunication between the primary and secondary chambers, the fluid in the secondary chamber 51 is also under pressure. The fluid pressure in the secondary chamber acting forwardly on the effective cross-sectional area of the piston head 37, including the shoulder 50, assists or supplements the actuating force applied through the link 62 acting on the piston rod 43, thereby reducing the externally applied actuating force required to build up any specified pressure in the primary chamber 35.

In view of their intercommunication, the primary and secondary chambers in effect form one combined pressure chamber in which the combined or net effective pressure producing area is equivalent to the sum of the effective pressure application area of the primary piston acting in a positive direction and the effective pressure application area of the secondary piston acting in an opposite or negative direction. Accordingly, the combined or net effective pressure producing area is equivalent to the difference between the effective areas of the primary and secondary pistons.

To assure substantial uniformity of pressure in both chambers at all times and to facilitate motion of the piston, the communicating ports 52, 53 and 54 are made relatively large. Since the two transverse ports 53 and 54 provide four fluid passages connecting with the longitudinal port 52, these two ports may be of somewhat smaller diameter than port 52. It is considered desirable to have the cross-sectional area of the communicating system at least as large as and preferably larger than that of the most restricted portion of the brake line including the tubing 21, the passage 20, the valve holes 25, etc., so that the flow resistance to piston motion in the communicating system will be no greater and preferably less than that in the brake system.

When the operating force is withdrawn, the pedal lever 65, arm 64, clevis 63 and link 62 are all returned to their respective normal positions by spring 67. Simultaneously, the compressed return spring 33 forces the piston 28 back toward its inoperative position thereby forcing the excess fluid originally transferred to the secondary chamber 51 to return through ports 53, 54 and 52 to the primary chamber 35. At the same time, the brake shoe return spring 81 forces the shoes 79 and 80, as well as the abutting pistons 74 and 75, back to their normal, inoperative, positions thereby forcing fluid back to the chamber 35 by lifting the valve cage 24 off its seat 23 against the weight of the spring 33.

Thus, the fluid returned to the primary chamber 35 includes fluid displaced or retransferred from the secondary chamber 51 as well as fluid returned from the liquid column in the supply line 21 and port 20.

Since the fluid retransferred from the secondary chamber 51 to the primary chamber 35 is insufficient to fill the latter in view of the latter's larger displacement and since, in addition, the spring loaded return valve 24 and the long and relatively small diameter conduits such as 21 tend to retard the return of fluid from the wheel cylinders and the brake lines to the primary chamber 35, the piston 28 under the action of its return spring 33 may be forced back more quickly than the expanding primary chamber can be replenished with fluid from the secondary chamber and the brake lines. In this event the fluid pressure in the primary and secondary chambers will be subatmospheric and accordingly less than in the annular chamber 41, resulting in the passage of sufficient fluid from said annular chamber through ports 39 and around the outer edges and deflected lips of the resilient piston cup 31 into the primary chamber 35 to fill the chambers and equalize the pressure. The piston cup 31 is provided with suitable recesses and channels as well as with deflectible lips to facilitate the passage of fluid from the annular chamber to the primary chamber as described above whereas it effectively prevents the passage of fluid in the opposite direction, so that it has both a sealing and a valving function.

Any fluid transferred to the primary chamber 35 from the annular chamber 41 is immediately replaced in the latter by fluid from the reservoir 12 passing through the connecting port 42.

Furthermore, since the same volume of fluid originally displaced from the primary chamber 35 upon brake application is eventually returned, the excess fluid introduced into the said chamber from the annular chamber 41 is automatically returned to the reservoir 12 through the compensating port 36 when the piston 28 returns to its inoperative position thereby uncovering the said port.

Similarly, any volumetric excesses or deficiencies in the brake system due to expansion or contraction because of temperature, minor leaks, etc., are compensated for by the passage of fluid to and from the reservoir 12 through the compensating port 36.

The piston return spring 33, which as indicated before also serves as a loading spring for the valve assembly comprising the cage 24, the cup 27 and the seat 23, is made heavy enough to maintain a slight positive pressure in the brake system to prevent the entrance of air.

The modification illustrated in Figs. 3 and 4 is similar in design and construction to the first embodiment described above. Accordingly, the respective parts have been given the same reference numbers as the corresponding parts in Figs. 1 and 2 except that in Figs. 3 and 4 these reference numbers are primed.

In Figs. 3 and 4, the piston 28' is of solid construction and is not provided with any ports connecting the primary compression chamber 35' and the secondary compression chamber 51'. Instead, fluid communication between these two chambers is provided by externally located tubing 88' the forward portion of which communicates with the primary chamber 35' through passage 89', and the rear portion of which communicates with the secondary pressure chamber 51' through passage 90', the necessary connections being effected through fittings 91', 92', 93' and 94'.

In order to provide free and unrestricted fluid communication between the pressure chambers during all phases of operation, the passage 89' is placed sufficiently far forward in the primary chamber 35' to prevent being closed off by piston cup 31' while passage 90' is located sufficiently far back in the secondary chamber 51' to avoid being closed off by sealing cup 38', all as shown in Figs. 3 and 4.

The elimination in this embodiment of the pressure chamber communicating ports through the piston obviates the need for a forward piston projection and makes it possible to provide the forward piston head 29' with a flush forward face as shown. The shapes of the piston cup 31' and of the spring cup 34' are accordingly somewhat different than in the previous embodiment.

The operation of the embodiment of Figs. 3 and 4 is the same as that of Figs. 1 and 2 except that the fluid communication is external instead of through the piston.

In Figs. 1 to 4, it is possible to obtain relatively large pressure increments since the piston rod diameter can be made relatively small, thereby providing a relatively large cross-sectional area for the secondary piston.

However, it is frequently desirable to provide only relatively small pressure increments and to achieve this the cross-sectional area of the secondary piston would have to be rather small in comparison with that of the primary piston. If the pressure chamber cylinders are of uniform diameter, this would require a relatively large piston rod diameter. A substantial increase in the diameter of the piston rod would make it difficult to accommodate the piston rod sealing means employed in the constructions thus far described.

To overcome this difficulty where only relatively small pressure increments are desired and, in general, to provide a somewhat simpler construction, it is desirable particularly where relatively large diameter piston rods must be used, to attach the piston rod sealing means to the piston rod for reciprocatory motion therewith instead of providing a stationary sealing means at the rear cylinder wall as in the previous embodiments.

This type of construction is shown in Fig. 5. The upper portion of the housing 111 encompasses a fluid reservoir 112 which is closed by the filler plug 115 vented at 116 and provided with baffle plate 114 to prevent surging fluid from spilling out through the vents 116.

The lower portion of the housing 111 forms a cylinder 117 closed at the forward end by plug 118 having interposed gasket 119 and provided with fluid port 120 connecting the cylinder 117 to the brake line 121 through the fitting 122.

Positioned against the rear face of the plug 118 is the rubber valve seat 123 against the front of which normally rests the valve head 124 which is held thereagainst by the fluid pressure in the brake line as well as by the light spring 125 acting on cup 127 connected to valve stem 113.

Embedded in the valve seat 123 is a metallic disk provided outwardly with a number of radially spaced projections or prongs such as 164 and 165 as well as with a number of inward projections such as 166 and 167.

Within the cylinder 117 is the piston 128 having a forward piston head 129 provided with annularly disposed liquid ports 130 normally closed by the rubber piston cup 131 which surrounds the piston projection 132 and rests against the forward face of piston head 129, being held in position by the return spring 133 disposed between the piston cup 131 and the spaced valve projections, such as 164 and 165, the piston end of the spring resting in spring cup 134.

The spring 133 also acts as a loading spring for the line valve assembly comprising the seat 123, head 124, spring 125, cup 127, stem 113 and disk having projections 164, 165, 166 and 167.

In the inoperative position of the piston 128, the primary fluid pressure chamber 135 is in fluid communication with the reservoir 112 through the compensating port 136.

More rearwardly the piston 128 has a second piston head 137 provided with front and rear sealing cups 138 and 139 respectively.

Between the two piston heads, the piston is of reduced diameter 140 surrounded by annular fluid chamber 141 communicating with the reservoir 112 through port 142.

Rearwardly of the second piston head 137 and of the rear sealing cup 139, the piston is again of reduced diameter in the form of a cylindrical extension or piston rod 143 which extends into an auxiliary cylinder 144 axially aligned with, connected to, and of smaller diameter than cylinder 117. Adjacent its rear end, the rod 143 flares out to form the piston head 146 which with the sealing cup 145 provides a tight fluid seal.

The portions of cylinders 117 and 144 between the sealing cup 139 and the piston head 146 and surrounding the piston rod 143, constitute a secondary fluid pressure chamber 151 which is in constant and unrestricted fluid communication with the primary pressure chamber 135 through interconnected fluid ports 152, 153 and 154 in the piston and piston rod, thereby providing equal pressures in both chambers.

In order to remove any air which may be trapped in the secondary chamber, the latter is provided at the top with the bleeder port 155 which is normally closed by the bleeder screw 156.

The housing extension 159 which contains the cylinder 144 is provided at the rear with the washer 160 which is held in place in its recess by the snap ring 161. In normal, inoperative position the end of the piston rod 143 abuts against the inner face of the washer 160, which accordingly serves as a piston stop.

The piston rod 143 is provided with a recess 147 to accommodate the pedal link 162 which passes through the hole in the washer 160. In normal, inoperative position a slight clearance is provided in front of the link as shown.

The rubber dust boot 170 surrounding the link 162 is provided to prevent the entrance of dirt into the cylinder.

The mechanism is kept filled to approximately the level 126 in the reservoir 112.

In operation, on the forward or pressure stroke, the pressure lifts the valve head 124 off its seat 123 thereby permitting the fluid to enter the brake line 121. On the return stroke, the back pressure, while forcing the valve head 124 tightly against its seat 123, lifts the seat away from its abutment on the rear face of the plug 118 against the force of the spring 133, permitting the returning fluid to by-pass the valve and return to to the chamber 135 by flowing between the several projecting prongs such as 164 and 165.

As in Figs. 1 to 4, the cross-sectional area of the secondary piston head is smaller than that of the primary piston. The effective cross-sectional area of the secondary piston or piston head 137 in Fig. 5 is determined by subtracting from the cross-sectional area of piston head 137 the cross-sectional area of piston head 146 and not the cross-sectional area at the narrower portion 143. Although the fluid pressure acting forwardly on the piston rod shoulder 150 produces a certain adidtional forward force, this is exactly offset by a similar backward force acting rearwardly against the piston head 146. These forces accordingly balance each other and manifest themselves only in longitudinal strain on the piston rod.

In the embodiments of Figs. 1 to 5, the primary and secondary pressure chambers are of the same diameter and, in order to attain a desired pressure increment, the necessary effective cross-sectional area of the secondary piston or piston head is achieved by altering the effective diameter of the piston rod.

In the embodiments of Figs. 6 and 7, the desired effective cross-sectional area of the secondary piston is obtained not only by changing the effective diameter of the piston rod but also by increasing or decreasing the diameter of the secondary pressure chamber cylinder as compared with that of the primary pressure chamber cylinder.

In Fig. 6, the housing 211 includes in its upper portion the reservoir 212 enclosed by vented filler plug 215 whereas its lower forward portion contains the primary cylinder 217 closed at the forward end by plug 218 connecting the cylinder 217 to the brake line 221 through passage 220 and fitting 222.

The valve cage 224 containing annularly disposed holes 225 normally closed by the projecting lips of valve cup 227, normally rests against the valve seat 223 which in turn is positioned against the rear face of plug 218.

Extending rearwardly from the primary cylinder 217 is a secondary cylinder 248 coaxial with and of somewhat larger diameter than cylinder 217. The piston 228 is provided with a primary or forward piston head 229 fitting into and adapted for reciprocatory motion within primary cylinder 217 as well as with a secondary piston head 237 fitting into and adapted for reciprocatory motion in the secondary cylinder 248.

The primary piston head 229 is provided with annularly spaced fluid ports 230 normally closed by piston cup 231 which is held in place against the front face of the piston head 229 by the return spring 233 disposed between the piston cup and the valve cage 224. As in Figs. 1 to 5, the return spring 233 also acts as a loading spring for the valve assembly, 223, 224 and 227.

The space within primary cylinder 217 in front of the piston cup 231 constitutes the primary pressure chamber 235 which, in the inoperative position of the piston 228, is in fluid communication with the reservoir 212 through the compensating port 236.

The secondary piston head 237 is provided with front and rear sealing cups 238 and 239 respectively.

The portion of the piston 228 between the primary and secondary piston heads is of reduced diameter 240 as shown, thereby forming the annular fluid chamber 241 communicating at all times with the reservoir 212 through the port 242.

Rearwardly of the secondary piston head 237, the piston 228 is again of reduced diameter in the form of the cylindrical extension or piston rod 243 extending into a third or auxiliary cylinder 244 coaxial with and connected to the rear of secondary cylinder 248. The piston rod 243 is provided at its end with a piston head 245 which, with its related sealing cup 246, provides a tight fluid seal.

The portions of the secondary and auxiliary cylinders 248 and 244 between the sealing cups 239 and 246 and surrounding the piston extension or rod 243, constitute a secondary pressure chamber 251 which is in constant and unrestricted fluid communication with the primary pressure chamber 235 through the interconnected fluid ports 252, 253 and 254 located in the piston and piston rod.

To remove any air which may be trapped in the secondary chamber, the latter is provided at its highest level with the bleeder port 255 which, after bleeding, is closed by bleeder screw 256.

The auxiliary cylinder 244 is contained within the threaded sleeve 250 which fits into the correspondingly threaded extension 259 formed by a rearward projection of the housing 211. The rear end of the cylinder 244 is counterbored to receive washer 260 which is held in place by snap ring 261, the purpose of the washer being to act as a piston stop by limiting rearward motion of the piston.

The piston extension or rod 243 contains a recess 247 to accommodate the pedal link 262 which passes through the hole in the washer 260. In normal, inoperative position, a slight clearance is provided between the link and piston as shown.

The flexible boot 270 surrounding the link 262 is provided to prevent the entrance of dirt into the cylinder.

The approximate fluid level in the reservoir is indicated at 226.

Since the secondary piston head 237 is of larger diameter than the primary piston head 229, the piston 228 must be inserted from the rear in assembling and for this reason the sleeve 250 is removable as shown. To facilitate the insertion during assembly of the bevelled lips of piston cup 238, the shoulder 263 is bevelled or sloped. A sloped shoulder 264 is also provided at the juncture of the primary cylinder 217 and the secondary cylinder 248 to facilitate the insertion of the piston cup 231 during assembly.

As in the previous embodiment depicted in Fig. 5, the effective cross-sectional area of the secondary piston head 237 is determined by subtracting the cross-sectional area of auxiliary cylinder 244 from the cross-sectional area of the secondary cylinder 248. These cylinders and their related piston heads are so dimensioned that the resulting effective cross-sectional area will be less than that of the primary cylinder 217.

Although the same result would be achieved by having the central portion of the piston rod 243 of the same outside diameter as the auxiliary piston head 245 for reasons outlined in connection with Fig. 5, the construction shown has the advantage in that accurate machining of the piston head 245 only is required, thereby reducing the cost of manufacturing.

Where, irrespective of the piston rod construction used, it is desired further to reduce the pressure increment, the secondary pressure chamber may be made of smaller diameter than the primary pressure chamber as illustrated in the embodiment shown in Fig. 7.

Apart from the smaller diameter of the secondary cylinder, this embodiment has an additional feature further distinguishing it from the embodiments of Figs. 1 to 4 in that the rear cylinder wall containing the sealing means is removable to provide ready access for the insertion and replacement of the sealing means and also to facilitate the use of a cup type seal which is generally of larger diameter than the ring type.

In Fig. 7, the housing 311 includes the reservoir 312 closed by the vented filler plug 315. The primary cylinder 317 is closed by the forward end plug 318 and connected to the brake line 321 through the port 320 and fitting screw 322.

The valve cage 324 having annularly disposed holes 325 normally closed by the lips of the valve cup 327, normally rests against the valve seat 323 which is positioned against the rear face of the plug 318.

The secondary cylinder 346 is in axial alignment with and extends rearwardly from the primary cylinder 317 but is of somewhat smaller diameter than the latter. The piston 328 has a primary or forward piston head 329 for reciprocatory motion in the primary cylinder as well as a secondary piston head 337 for reciprocatory motion in the secondary cylinder 346.

The primary piston head 329 is provided with annularly spaced fluid ports 330 normally closed by the flexible piston cup 331, the latter being held in place against the front face of the piston head 329 by the return spring 333 which is positioned between the piston cup 331 and the valve cage 324 with the piston end resting in the spring cup 334, the said spring thereby also serving as a loading spring for the valve assembly 323, 324 and 327.

Contained within the primary cylinder 317 and in front of the piston cup 331 is the primary pressure chamber 335 which in the inoperative or retracted position of the piston 328 is in fluid communication with the reservoir 312 through the compensating port 336.

The secondary piston head 337 is provided with front and rear sealing cup 338 and 339 respectively.

The portion of the piston 328 between the primary and secondary piston heads is of reduced diameter 340, thereby providing the annular fluid chamber 341 which is at all times in fluid communication with the reservoir 312 through the port 342. The fluid in the annular chamber is accordingly always at reservoir or atmospheric pressure.

Extending rearwardly from the housing 311 is the housing extension 359 which is internally threaded to receive the rear end plug 350 containing the end wall portion 344.

The piston 328 is also provided with a rearwardly extending piston rod 343 comprising a larger diameter forward portion 349 and a smaller diameter rear portion 348 which latter extends rearwardly through a corresponding opening in the end wall 344. The sealing cup 345 positioned in a suitable recess in the plug 350 and surrounding the rear piston rod portion 348 is provided to prevent leakage.

At the juncture of the forward and rear portions, 349 and 348, respectively, the piston rod 343 is provided with a shoulder 347 which in the inoperative position of the piston 328 rests against an abutment provided by the forward face of the end plug 350, thereby limiting the rearward motion of the piston.

The space between the sealing cups 345 and 339 surrounding the piston rod 343 constitutes the secondary pressure chamber 351 which is at all times in unrestricted fluid communication with the primary pressure chamber 335 through the intercommunicating fluid ports 352, 353 and 354 in the piston and piston rod, thereby providing equal pressures in the two pressure chambers.

To remove any air which may be trapped in the secondary pressure chamber 351, there is provided the bleeder port 355 which is connected to the uppermost portion of the secondary chamber and which, after bleeding, is plugged by the bleeder screw 356.

The end plug 350 is provided at the rear with the washer 360 held in place by the snap ring 361.

Passing through the hole in the washer 360 is the pedal link 362 which has a head portion 369 which in normal, inoperative position rests against the inner face of the washer 360. In this position a slight clearance is provided between the link head 369 and the piston rod 343.

The flexible boot 370 surrounding the pedal link 362 serves to prevent the entrance of dirt into the cylinder.

The numeral 326 indicates the approximate fluid level maintained in the reservoir 312.

Inasmuch as the primary piston head 329 is larger than the secondary piston head 337, the piston 328 must be inserted from the front in assembling. To facilitate the insertion during assembly of the lips of the sealing cup 339 into secondary cylinder 346, the sloped shoulder 364 is provided at the juncture of the primary and secondary cylinders.

The end plug 350 is removable in order to facilitate the use of a cup type sealing means, such as 345, adjacent the end wall and also to facilitate the insertion, inspection and replacement of said sealing cup.

The effective cross-sectional area of the secondary piston head 337 is ascertained by subtracting the cross-sectional area of the rear piston rod portion 348 from the cross-sectional area of the secondary cylinder 346. The effective cross-sectional area will obviously be less than that of the primary piston head 329.

It will be apparent from the above descriptions that the effective cross-sectional area of the secondary piston or piston head must be made less than that of the primary piston.

If the effective cross-sectional area of the secondary piston were larger than that of the primary piston, the mechanism of the invention would function in reverse. That is, the secondary chamber would become the primary chamber and vice versa, so that the return stroke of the piston would become the operating stroke, thereby requiring a pull instead of a push on the piston rod for operation.

Since the primary and secondary pressure chambers are in constant fluid communication, it is immaterial to which chamber the pressure outlet line is connected.

In the embodiments of Figs. 1 to 7, the fluid ports or passages connecting the primary and secondary pressure chambers are preferably of relatively large diameter.

Instead of the cage type valve in Figs. 2, 3, 6 and 7 or the mushroom type valve in Fig. 5, other types of outlet valves may be used.

It will be seen from the above description that my invention affords a simple, inexpensive and effective means for providing hydraulic advantage and has particular application where smaller diameter cylinder piston combinations cannot successfully be used or where increased leverage or other forms of mechanical advantage cannot advantageously be applied because of space limitations, structural complexity, disproportionately higher cost of manufacture and maintenance or added lubrication problems.

In Figs. 1 to 7, the piston means may be considered as a single piston since it is a unitary member or it may be considered as comprising two pistons, a primary and a secondary, since the forward and rear portions or faces have different functions.

In Figs. 6 and 7, the cylinder member for the primary and secondary chambers is of different diameters whereas in Figs. 1 to 5, one cylinder of uniform diameter is used for both chambers. In Figs. 1 to 5, the dual purpose cylinder may be considered as one cylinder since it is one continuous member or it may be considered as comprising two cylinders since the forward and rear portions have different functions, one defining the primary chamber and the other the secondary chamber.

As used in the claims, the term "piston rod" includes not only the elements 43 in Figs. 1 and 2, 43' in Figs. 3 and 4, and 343 in Fig. 7, but also the elements 143 in Fig. 5 and 243 in Fig. 6.

As used in the claims, the term "passage means" includes the longitudinal passage in the piston together with all of the four transverse passages branching therefrom provided by the two transverse ports communicating with the longitudinal passages and designated by reference numbers 52, 53, and 54 in Figs. 1 and 2; 152, 153 and 154 in Fig. 5; 252, 253 and 254 in Fig. 6; and 352, 353 and 354 in Fig. 7; and also includes the external passage 88', 89', 90' in Figs. 3 and 4.

What is claimed is:

1. A fluid pressure producing device comprising a cylinder member, a piston reciprocable therein having a pair of spaced heads forming with said cylinder member a pair of pressure chambers at opposite ends of the piston and an intermediate chamber between the heads in communication with a fluid supply source, actuating means for the piston including, a piston rod extending through one of said pressure chambers, passage means connecting the pressure chambers and providing constant fluid communication between them, pressure responsive means for by-passing fluid in one direction past one of said heads, sealing means to prevent passage of fluid in either direction past the other of said heads, and a discharge port for one of said pressure chambers.

2. A fluid pressure producing device comprising a reservoir, a cylinder supplied therefrom, a piston reciprocable in the cylinder and having a pair of spaced heads forming with said cylinder a forward pressure chamber ahead of said piston and defined by one of said heads, a rear pressure chamber behind said piston defined by the other of said heads and an intermediate chamber between the heads, means for moving the piston including a piston rod in the rear pressure chamber, continuously unrestricted passage means connecting said pressure chambers for freely by-passing fluid between said chambers past said piston during all piston motion, and a discharge port for one of said pressure chambers, said reservoir communicating directly through separate ports in the cylinder with the intermediate chamber and the forward pressure chamber and communicating with the rear pressure chamber only by way of said forward pressure chamber and said connecting passage means.

3. A fluid pressure producing device comprising a fluid supply source, a cylinder member, a piston reciprocable therein having a pair of spaced heads, one forward of the other, a chamber between said heads in constant direct communication with said fluid supply source, a pressure chamber ahead of the forward head, a second pressure chamber behind the other head, means for moving the piston including a piston rod extending through the second pressure chamber, constantly open passage means connecting said pressure chambers and providing continuously unrestricted fluid communication between them at all times and during all piston motion, said passage means providing substantially uniform cross-sectional flow areas throughout its length, and a discharge port connected to one of said pressure chambers.

4. A fluid pressure producing device including a reservoir, a cylinder member having a discharge port at one end and an opening at the other end, a one-piece piston reciprocable in said cylinder member and having spaced heads, one forward of the other, and an integral rearward extension extending into said opening and in conjunction with sealing means forming a fluid tight closure therewith, a compressible pressure chamber in front of the forward head, an intermediate chamber between the heads movable with the piston and in direct communication with the reservoir in all piston positions, an expansible pressure chamber in back of the rear head, a continuously open passage connecting the two pressure chambers and providing free fluid communication therebetween at all times and in all piston positions, and means associated with the rearward head for inhibiting direct passage of fluid in either direction past said head between the intermediate chamber and the rear pressure chamber.

5. In a fluid pressure producing device, in combination, a source of fluid, a cylinder member having forward and rear cylinder portions, a piston in said cylinder member having a forward piston head provided with a forwardly facing pressure application surface and reciprocable in said forward cylinder portion and rearwardly spaced therefrom a rear piston head provided with a rearwardly facing pressure application surface and reciprocable in said rear cylinder portion, the effective pressure application area of said forward pressure application surface being larger than that of said rearward pressure application surface, a volumetrically compressible pressure chamber in front of said forward head, an intermediate chamber between said piston heads reciprocable therewith and in direct communication at all times with said source of fluid, a volumetrically expansible pressure chamber in back of said rear head in direct and open communication at all times and in all positions of the piston with said compressible pressure chamber, means for inhibiting the passage of fluid past and through the rear head in both directions, means to actuate the piston including a piston rod extending into said chamber in back of the rear head, and a discharge port connected to one of said pressure chambers.

6. A master cylinder for a hydraulic braking system including a cylinder element having forward and rear cylinder portions, a piston in said cylinder element having an inoperative position therein and being advanceable to and returnable from operative positions therein and having a forward head reciprocable in said forward cylinder portion and rearwardly spaced therefrom a rearward head reciprocable in said rear cylinder portion, a piston rod associated with and for advancing said piston and extending rearwardly into an opening in the rear of said rear cylinder portion and in conjunction with sealing means forming a fluid tight closure therewith to constantly inhibit the passage of fluid therepast, an intermediate chamber between said heads reciprocable therewith and in constant communication with a fluid supply source, a forward pressure chamber in said forward cylinder portion in front of and defined by said forward head, a rear pressure chamber in said rear cylinder portion in back of and defined by said rearward head, a continuously open passage connecting the two pressure chambers and providing constant and substantially free fluid communication between them, said forward pressure chamber being volumetrically compressed and said rear pressure chamber to a lesser extent volumetrically expanded during any given advance of the piston, pressure responsive means associated with ports in the forward head for permitting passage of fluid past said head from the intermediate chamber to the forward pressure chamber but inhibiting passage of fluid in the reverse direction, means associated with said rearward head to constantly inhibit the passage of fluid past said head between the intermediate and rear pressure chambers, and a discharge port for one of said pressure chambers.

7. In a fluid pressure producing device, a cylinder, a piston reciprocable therein having a pair of spaced heads forming with said cylinder a pair of pressure chambers at opposite ends of the piston and an intermediate chamber between the heads in communication with a fluid supply source, means for advancing the piston including a piston rod extending through one of said pressure chambers, means for returning the piston, a continuously open passage through the piston connecting the pressure chambers and providing free and unrestricted communication between them at all times and during all piston motion, pressure responsive means for by-passing fluid in one direction past one of said heads, sealing means to prevent passage of fluid in either direction past the other of said heads, and a discharge port for one of said pressure chambers.

8. A fluid pressure producing device comprising a fluid supply source, a cylinder member, a piston reciprocable therein having a pair of spaced heads, a chamber between said heads in direct communication with said fluid supply source, a pressure chamber in said cylinder member ahead of said piston and defined by one of said heads, a second pressure chamber in said cylinder member behind said piston and defined by the other of said heads, actuating means for said piston including a piston rod extending in said second pressure chamber, and constantly open passage means through said piston connecting said pressure chambers and providing unrestricted fluid communication between them at all times and during all piston motion, said passage means having longitudinal and transverse portions, the latter having an aggregate cross-sectional flow area at least as large as that of the longitudinal portion.

9. A fluid pressure producing device including a cylinder member, a piston reiprocable therein having a forward head and a rearward head, a chamber between said heads in constant direct communication with a fluid supply source, a pressure chamber ahead of said forward head, a second pressure chamber behind said rearward head, means for moving the piston including a piston rod extending into the second pressure chamber, a discharge port connected to one of said pressure chambers, and continuously unrestricted passage means connecting the pressure chambers and providing unobstructed fluid communication between them at all times and during all piston motion, said passage means comprising a longitudinal passage in the piston opening into the first mentioned pressure chamber and a transverse passage connected with the longitudinal passage and opening into the second pressure chamber, the transverse passage having a cross-sectional flow area at least one-fourth as large as that of the longitudinal passage.

10. A fluid pressure producing device including a reservoir, a cylinder member, a piston reciprocable therein having a pair of spaced heads defining with said cylinder member a pair of pressure chambers at opposite ends of the piston and an intermediate chamber between the heads, means for moving the piston including a piston rod integral with the piston and extending through one of said pressure chambers, a discharge port for one of said pressure chambers, and continuously open passage means connecting said pressure chambers and providing free and unobstructed fluid communication between them at all times and during all piston motion, said passage means comprising a longitudinal passage in the piston opening into one of said pressure chambers and a plurality of transverse passages communicating with the longitudinal passage and opening into the other of said pressure chambers, said reservoir communicating directly through separate ports in the cylinder member with the intermediate chamber and one of said pressure chambers and communicating only by way of said last mentioned pressure chamber and said connecting passage means with the other of said pressure chambers.

11. In a fluid pressure producing device, a cylinder member comprising a plurality of cylinders of different diameters arranged end to end in tandem, the rearmost cylinder being of smaller diameter than the cylinder adjacent thereto, a piston reciprocable in said cylinder member having three spaced heads including a rear head in said rearmost cylinder, a forward head and an intermediate head between the two, said heads, forming in said cylinder member a rear pressure chamber between the rear and intermediate heads, an intermediate chamber between the intermediate and forward heads in communication with a fluid supply source, and a forward pressure chamber in front of the forward head, means for moving said piston, passage means open at all times providing constant and unobstructed intercommunication between the pressure chambers, pressure responsive means to permit bypassing of fluid past the forward head from the intermediate to the forward pressure chamber, sealing means to prevent passage of fluid past the intermediate head between the intermediate and rear pressure chambers, additional sealing means to prevent leakage of fluid past the rear head, and a discharge port for one of said pressure chambers.

12. A fluid pressure producing device including a fluid supply source, a cylinder member having forward and rear cylinder portions of different diameters and an opening at the rear end of smaller cross-section than the rear portion, a piston in said cylinder member having a forward head reciprocable in said forward cylinder portion and a rear head reciprocable in said rear cylinder portion, a piston rod for moving said piston and extending rearwardly into said opening, a primary pressure chamber in said forward cylinder portion in front of and defined by said forward head, an intermediate chamber between said heads in direct communication with said fluid supply source, a secondary pressure chamber in said rear cylinder portion in back of and defined by said rear head, a continuously open passage connecting said pressure chambers and providing free fluid communication between them in all positions of the piston and during all piston motion, and a discharge port for one of said pressure chambers.

13. In a fluid pressure producing device, a cylinder member having forward and rear cylinder portions of different diameters, a piston in said cylinder member having a forward head reciprocable in said forward cylinder portion and a rear head reciprocable in said rear cylinder portion, said heads forming in said cylinder member a forward pressure chamber in front of the forward head, a rear pressure chamber in back of the rear head and an intermediate chamber between the heads in communication with a fluid supply source, means for moving said piston including a piston rod extending through said rear pressure chamber, continually open passage means for permitting free passage of fluid between said pressure chambers, pressure responsive means for permitting passage of fluid past the forward head from the intermediate to the forward pressure chamber, sealing means for preventing passage of fluid in either direction past the rear head between the intermediate and rear pressure chambers, and a discharge port for one of said pressure chambers.

14. A fluid pressure producing device including a fluid supply source, a cylinder member having a forward cylinder portion and a rear cylinder portion of larger diameter than said forward cylinder portion, an opening in back of said rear cylinder portion of smaller cross-section than said rear portion, a piston in said cylinder member having a forward head reciprocable in said forward cylinder portion and a rearward head reciprocable with the forward head in said rear cylinder portion, rearwardly extending piston rod means for moving said piston and forming a closure in said opening, a forward pressure chamber in said forward cylinder portion in front of and defined by said forward head, an intermediate chamber between said heads in constant direct communication with said fluid supply source, a rear pressure chamber in said rear cylinder portion in back of and defined by said rearward head, and a continuously open passage connecting said pressure chambers and providing free fluid communication between them at all times and in all positions of the piston.

15. A fluid pressure producing device including a fluid supply source, a cylinder member having a forward cylinder portion and a rear cylinder portion of smaller diameter than said forward cylinder portion, an opening in back of said rear portion of smaller cross-section than said rear portion, a piston in said cylinder member having a forward head reciprocable in said forward cylinder portion and a rearward head reciprocable with the forward head in said rear cylinder portion, rearwardly extending piston rod means for moving said piston and forming a closure in said opening, a forward pressure chamber in said forward cylinder portion in front of and defined by said forward head, an intermediate chamber between the heads in direct communication with said fluid supply source in all positions of the piston, a rear pressure chamber in said rear cylinder portion in back of and defined by said rearward head, and an open passage connecting said pressure chambers and providing free and unobstructed fluid communication between them at all times and in all positions of the piston.

GUSTAV MATTERSDORF.

REFERENCES CITED

The following references are of record in the file of this patent:

UNITED STATES PATENTS

| Number | Name | Date |
|---|---|---|
| 2,060,692 | Rockwell | Nov. 10, 1936 |
| 2,166,724 | Loweke | July 18, 1939 |
| 2,244,562 | Loweke | June 3, 1941 |
| 2,275,700 | Swift | Mar. 10, 1942 |

FOREIGN PATENTS

| Number | Country | Date |
|---|---|---|
| 573,273 | France | Mar. 7, 1924 |
| 442,341 | Great Britain | Feb. 6, 1936 |